United States Patent [19]
Daneshgari

[11] Patent Number: 5,745,390
[45] Date of Patent: Apr. 28, 1998

[54] METHOD AND SYSTEM FOR REDUCING DEVELOPMENT TIME OF COMPLEX SYSTEMS UTILIZING CORRELATION MATRICES

[75] Inventor: Parviz Daneshgari, Flint, Mich.

[73] Assignee: Regents of the University of Michigan, Ann Arbor, Mich.

[21] Appl. No.: 804,393

[22] Filed: Feb. 21, 1997

[51] Int. Cl.$^6$ .................................................. G05B 17/02
[52] U.S. Cl. ...................... 364/580; 364/468.16; 364/550
[58] Field of Search .......................... 364/550, 551.01, 364/551.2, 552, 554, 580, 468.02, 468.03, 468.09, 468.1, 468.12–468.17; 705/7

[56] References Cited

U.S. PATENT DOCUMENTS

| | | | |
|---|---|---|---|
| 5,086,397 | 2/1992 | Schuster et al. | 364/486 |
| 5,208,765 | 5/1993 | Turnbull. | |
| 5,216,612 | 6/1993 | Cornett et al. | 364/468 |
| 5,278,751 | 1/1994 | Adiano et al.. | |
| 5,414,645 | 5/1995 | Hirano | 364/551.01 |
| 5,555,406 | 9/1996 | Nozawa. | |
| 5,655,074 | 8/1997 | Rauscher | 364/552 |

*Primary Examiner*—James P. Trammell
*Attorney, Agent, or Firm*—Brooks & Kushman P.C.

[57] ABSTRACT

A method and system for reducing development time of a complex system such as an automobile engine utilizing correlation matrices are provided. First, second and tertiary level correlation matrices are preferably created and stored on a computer system in a LAN. The correlation matrices are provided to identify the minimum necessary tests and components that are required to parallel test the subsystems of a selected major engine system without the use of the entire engine. In a matrix development stage, test procedures are researched and various engineers are consulted to subjectively rank the matrices to obtain subjective matrices. These rankings allow one to determine which components are required to validate an engine subsystem test. In addition, an objective matrix is developed in a matrix validation procedure based on actual test results of a fully functional engine. This allows the user to compare the objective matrix with a corresponding subjective matrix to determine a level of confidence. Use of this method and system would enable engineers to predict the behavior of subsystems within their natural environment with a high level of confidence.

32 Claims, 10 Drawing Sheets

Fig. 3

| | Crankshaft | Main caps | main bearing | Conn. rods | Rod bearing | Wristpins | Pistons | Piston rings | Harm. Bal. | Flywheel | Starter |
|---|---|---|---|---|---|---|---|---|---|---|---|
| Crank sys. | 3 | 3 | 3 | 3 | 3 | 3 | 3 | 3 | 3 | 3 | 3 |
| Valve sys. | 2 | 2 | 2 | 2 | 2 | 2 | 2 | 2 | 2 | 2 | 0 |
| Ignition sys | 2 | 1 | 1 | 1 | 1 | 1 | 2 | 2 | 2 | 2 | 0 |
| Ign. Drive | 3 | 1 | 1 | 1 | 1 | 1 | 1 | 1 | 1 | 1 | 0 |
| Fuel sys. | 1 | 1 | 1 | 1 | 1 | 1 | 1 | 1 | 1 | 0 | 0 |
| Lub. sys | 3 | 3 | 2 | 2 | 2 | 2 | 3 | 3 | 0 | 0 | 0 |
| Emis. con. | 1 | 0 | 0 | 0 | 0 | 0 | 0 | 0 | 0 | 0 | 0 |
| Prot. Cover | 2 | 2 | 2 | 2 | 2 | 2 | 2 | 2 | 0 | 1 | 0 |
| Sensors | 1 | 0 | 0 | 0 | 0 | 1 | 0 | 0 | 0 | 0 | 0 |
| Cooling sys | 0 | 0 | 0 | 0 | 0 | 1 | 2 | 2 | 0 | 0 | 0 |
| Tot Impact | 18 | 13 | 12 | 12 | 12 | 13 | 17 | 17 | 10 | 11 | 3 |

Fig. 8

| | Camshaft | Lifters | Pushrods | Rocker arm | Valve spring | Retainers | Exhaust val | Intake valve |
|---|---|---|---|---|---|---|---|---|
| Crank sys | 3 | 3 | 2 | 2 | 2 | 2 | 3 | 3 |
| Valve sys | 3 | 3 | 3 | 3 | 3 | 3 | 3 | 3 |
| Ignition sys | 2 | 0 | 0 | 0 | 0 | 0 | 1 | 1 |
| Ign. Drive | 3 | 3 | 2 | 2 | 2 | 2 | 2 | 2 |
| Fuel sys | 1 | 0 | 0 | 0 | 0 | 0 | 1 | 1 |
| Lub sys | 3 | 3 | 3 | 3 | 3 | 3 | 3 | 3 |
| Emis Con | 1 | 1 | 0 | 0 | 0 | 0 | 1 | 1 |
| Prot Cover | 2 | 2 | 3 | 3 | 2 | 2 | 3 | 3 |
| Sensors | 2 | 0 | 0 | 0 | 0 | 0 | 0 | 0 |
| Cooling sys | 0 | 0 | 0 | 0 | 0 | 0 | 0 | 0 |
| Tot Impact | 20 | 15 | 13 | 13 | 12 | 12 | 20 | 21 |

Fig. 9

METHOD AND SYSTEM FOR REDUCING DEVELOPMENT TIME OF COMPLEX SYSTEMS UTILIZING CORRELATION MATRICES

TECHNICAL FIELD

This invention relates to methods and systems for reducing development time of complex systems and, in particular, to methods and systems for reducing development time of complex systems utilizing correlation matrices.

BACKGROUND ART

Early market introduction is essential in today's competitive business world since it can lead to increased profits and a commanding position in that marketplace. One contributor to the major time-lags in introducing new products-to-market is the time spent in their testing and validation.

The automotive industry is not an exception to this phenomenon. On the average, 30% of the total cost of a vehicle is its engine. The range of current engine development time is anywhere from 36 to 60 months. Most American engine manufacturing companies are at the high end of this spectrum. The automobile engine is a complex machine. Manufacturers have to spend large amounts of money and time to develop a whole engine for test and validation.

The Turnbull U.S. Pat. No. 5,208,765, discloses a method and structure for monitoring product development. The product development is divided into a plurality of stages. Each stage, in turn, includes a set of requirements which must be completed in order for the stage to be completed. Each requirement is provided with a unique identifier for ease of reference to the requirement. Each requirement also has associated with it an indicium for indicating the status of that requirement. Each stage and its requirements are capable of being visually displayed, typically on a display unit connected to a computer system.

The Adiano et al., U.S. Pat. No. 5,278,751, discloses a system and method for linking Quality Function Deployment (QFD) data and actual process data which uses a knowledge based expert system in combination with QFD principles to provide an interactive system capable of allowing dynamic changes to a manufacturing process in response to customer input. The system provides navigation and manipulation aids. The QFD House of Quality is remodeled by enlarging it to accommodate additional matrices of data not previously associated with the QFD house. A relational database is provided for correlating data about the manufacturing process and customer needs as well as new matrices, one of which maps product parameters to the customer data or the manufacturing process data. Another matrix identifies responsibility for control, or ownership of particular product parameters The Nozawa U.S. Pat. No. 5,555,406, discloses a design assisting apparatus for assisting the design of parts of a product comprised of an assembly of a plurality of parts. The design assisting apparatus is comprised of a plurality of part suitability examination devices and a product suitability examination device. Each part suitability examination device is comprised of a part performance decision device, a part knowledge database for each input, and a part optimization device. The part optimization device optimizes the initially input parameters of a part by referring to the part knowledge stored in the corresponding part knowledge data base. The product suitability examination device comprises a product performance decision device, a product knowledge database, and a product optimization device. The production optimization device optimizes the parameters of the parts constituting the product by referring to the product knowledge stored in the product knowledge database. The parameters of the plurality of parts output by the part suitability examination device are optimized to satisfy the target performances for the product and then are output.

Despite the numerous benefits of early market introduction, a method and system which would reduce product development time and ensure product validation is still sought after.

SUMMARY OF THE INVENTION

An object of the present invention is to provide a method and system for reducing development time of a complex system such as an automotive engine utilizing Quality Function Deployment (QFD) techniques to obtain information for use in correlation matrices which predict behavior of subsystems of a major system of the complex system.

Another object of the present invention is to provide a method and system for reducing development time of a complex system utilizing correlation matrices to identify components that are necessary to test a subsystem of a major system of the complex system thereby allowing parallel testing rather than sequential testing.

Yet another object of the present invention is to provide a method and system for reducing development time of a complex system utilizing correlation matrices to identify the minimum number of components that are required to test a subsystem of a major system of the complex system thereby allowing parallel testing rather than sequential testing.

Yet still another object of the present invention is to provide a method and system for reducing development time of a complex system utilizing correlation matrices to identify critical components required to initiate parallel testing of subsystems of a major system of the complex system and the calculation of a confidence level in a matrix validation stage.

In carrying out the above objects and other objects of the present invention, a method is provided for reducing development time of a complex system utilizing correlation matrices. The complex system has major systems each of which have subsystems. Each subsystem has components. The method includes the steps of creating and storing on a computer system correlation matrices for correlating the major systems to the subsystems and the subsystems to the components. The method also includes the step of selecting subsystems to be tested and components required in each subsystem test from the stored correlation matrices. The method finally includes the step of testing the selected subsystems separate from the complex system to obtain a first set of test results for each of the tested subsystems.

In carrying out the above objects and other objects of the present invention, a system is also provided for reducing development time of a complex system utilizing correlation matrices. The complex system has major systems, each of which has subsystems. Each subsystem has components. The system includes a computer system programmed for creation and storage of correlation matrices for correlating the major systems to the subsystems and the subsystems to the components. The computer is also programmed for selection of subsystems to be tested and components required for each subsystem test from the stored correlation matrices. The system of the invention also includes means for testing the selected subsystems in parallel separate from the complex system to obtain a first set of test results for each of the tested subsystems.

Still further in carrying out the above objects and other objects of the present invention, a method is provided for reducing development time of a complex system such as an automobile engine utilizing correlation matrices. The complex system has major systems, each of which has a subsystem. Each subsystem has components. The method includes the steps of creating and storing on a computer system correlation matrices correlating the major systems to the subsystems, the subsystems to the components and the components to component tests. The method further includes the step of selecting subsystems to be tested, components required for each subsystem test and component test required to test the subsystems from the stored correlation matrices. The method finally includes the step of testing the selected subsystems in parallel separate from the complex system to obtain a first set of test results for each of the tested subsystems.

Yet still further in carrying out the above objects and other objects of the present invention, a system is provided for carrying out the steps of the method immediately above.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a view of a crankshaft correlation matrix of a crankshaft system;

FIG. 8 is a view of a valve subsystem correlation matrix;

FIG. 9 is a view of a valve test tertiary correlation matrix; and

BEST MODE FOR CARRYING OUT THE INVENTION

In general, due to the numerous benefits of early market introduction, a method and system which would reduce product development time and ensure product validation is desired. This can be achieved by utilizing Quality Function Deployment (QFD) techniques. Quality function deployment is a development tool that translates the voice of the customer into technical requirements.

In a first embodiment of the present invention, this information is then placed into a correlation matrix with the engineering or technical characteristic on the x-axis and the customer attributes on the y-axis. Using the QFD approach, a matrix is developed to predict the subsystem behavior without the use of the entire engine. The main purpose of the correlation matrix used here is to identify the minimum number of subcomponents or components required to bench test a subsystem. To do so, the matrix is then subjectively ranked. These rankings will allow one to determine which subcomponents are required to validate the selected engine subsystem.

In addition, an objective matrix is developed in the matrix validation procedure based on actual test results of a fully functional engine. A subjective matrix contains the rankings as determined by OEM engineers and experts, whereas the objective matrix contains the rankings based on the results obtained in the validation step. This allows the user to compare the objective matrix with the subjective matrix and determine the level of confidence. Use of this method and system would enable engineers to predict the behavior of a sub-system within its natural environment with a high level of confidence.

Figure 1:
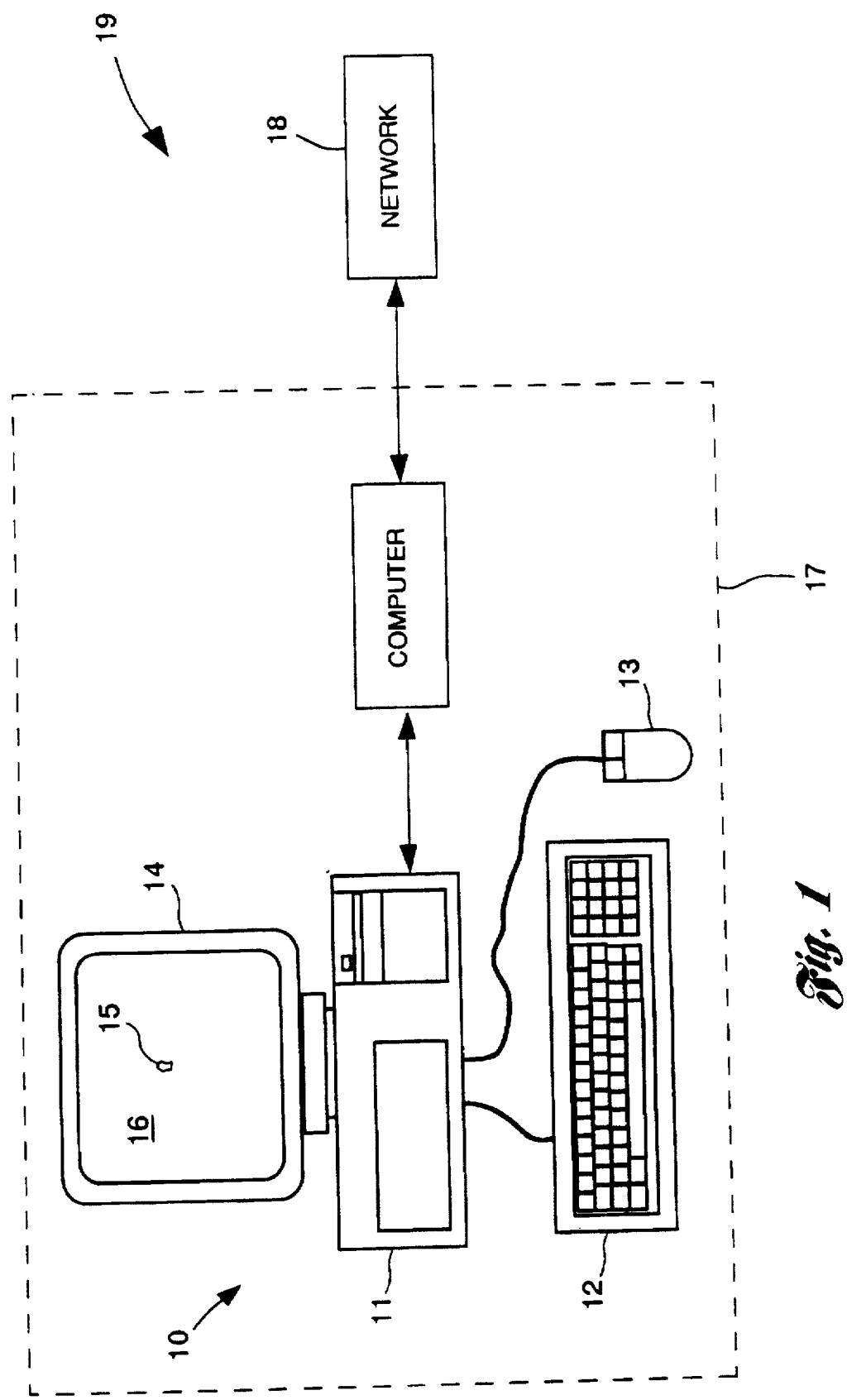
FIG. 1 is a schematic diagram of a computer system connected in a network of computer systems which network in turn is connected to other networks to form an internet.

Referring now to the drawing figures, there is illustrated in FIG. 1 a computer system such as a personal computer 10 on which the correlation matrices of the present invention can be created, stored, displayed and selected. The computer 10 includes a system unit 11, a keyboard 12, a mouse 13, and a graphics display device or monitor 14. The keyboard 12 and the mouse 13 constitute user input devices and the display device 14 is a user output device. The mouse 13 is used to control a cursor or pointer 15 displayed on the screen 16 of the display device 14. A graphical user interface (GUI) supported by the system allows the user to point and shoot by moving the cursor 15 to an icon (i.e. small graphic image) or specific location on the screen 16 and then press one of the mouse buttons to perform a user command or selection.

While the invention is specifically disclosed for use with a personal computer such as the personal computer 10, the invention may be run on a variety of computers under a number of different operating systems. The computer could, for example, be a microcomputer such as the personal computer 10, a mini-computer or a mainframe computer. A computer may be a stand-alone system, part of a network, such as a network 17 which may be a local area network or a wide area network or a larger teleprocessing system such as an internet 19 (i.e., a network of networks such as network 17 and a network 18). The specific choice of a computer system is limited only by memory and disk storage requirements.

The personal computer shown in FIG. 1 and, in particular, the system unit 11 of the personal computer 10, typically includes a system bus to which the various components are attached and by which communication between the various components is accomplished. Typically, the system 11 also includes a microprocessor which is connected to the system bus and is supported by read-only memory (ROM) and random access memory (RAM) also connected to the system bus. The microprocessor may be one of the Intel family of microprocessors or other microprocessors including, but not limited to, Motorola's family of microprocessors and other RISC microprocessors manufactured by IBM, Hewlett-Packard, Sun Microsystem, Intel, Motorola and others.

The hardware of the computer system 10 illustrated in FIG. 1 is typically what may vary for a specific application. For example, there may be other peripherals such as optical storage media, audio input/output, printers and the like.

Matrix Construction

The first step in applying this method is the identification step, this step is used to identify the major engine systems, major engine subsystems, and the subcomponents or components of each. The identification step allows one to determine how detailed the study will be. For instance, there are hundreds of components within the engine and if each was used, the illustration would be very cumbersome. Tables 1 and 2 illustrate the engine break down into major systems, subsystems and their components.

TABLE 1

Major Engine Systems

| | |
|---|---|
| 1. | Block |
| 2. | Cylinder Head |
| 3. | Intake Manifold |
| 4. | Exhaust Manifold |
| 5. | Accessory Drive |

TABLE 2

Major Engine Subsystems

| Crankshaft Subsystem | Valve Subsystem |
|---|---|
| Crankshaft | Camshaft |
| Main Bearing Caps | Lifters |
| Main Bearings | Pushrods |
| Connecting Rods | Rocker Arms |
| Rod Bearings | Valve Springs |
| Wristpins | Retainers |
| Pistons | Exhaust Valves |
| Piston Rings | Intake Valves |
| Harmonic Balancer | |
| Flywheel | |
| Starter | |

| Ignition Subsystem | Emissions Control Subsystem |
|---|---|
| Distributor (Cap, Rotor, Plug Wires) | Catalytic Converter |
| Spark Plugs | AIR System |
| Direct Ignition System: Individual Coil | EGR System |
| DIS: Waste Spark | PCV System |
| Alternator | EEC (Vapor Canister) |

| Ignition Drive | Fuel Subsystem |
|---|---|
| Timing Gears | Throttle Body |
| Timing Chain | Fuel Injection |

| Protective Covers | Cooling Subsystem |
|---|---|
| Valve Covers | Water Pump |
| Valve Cover Baffles | Thermostat |
| Timing Chain Cover | External Coolant Plumbing |

| Lubrication Subsystem | Sensors |
|---|---|
| Oil Filter | EGO Sensor |
| Oil Pump and Pickup | Temperature Sensor |
| Oil Pan | Oil Pressure Sensor |
| Oil Pan Baffles | Crank Position Sensor |

Figure 2:
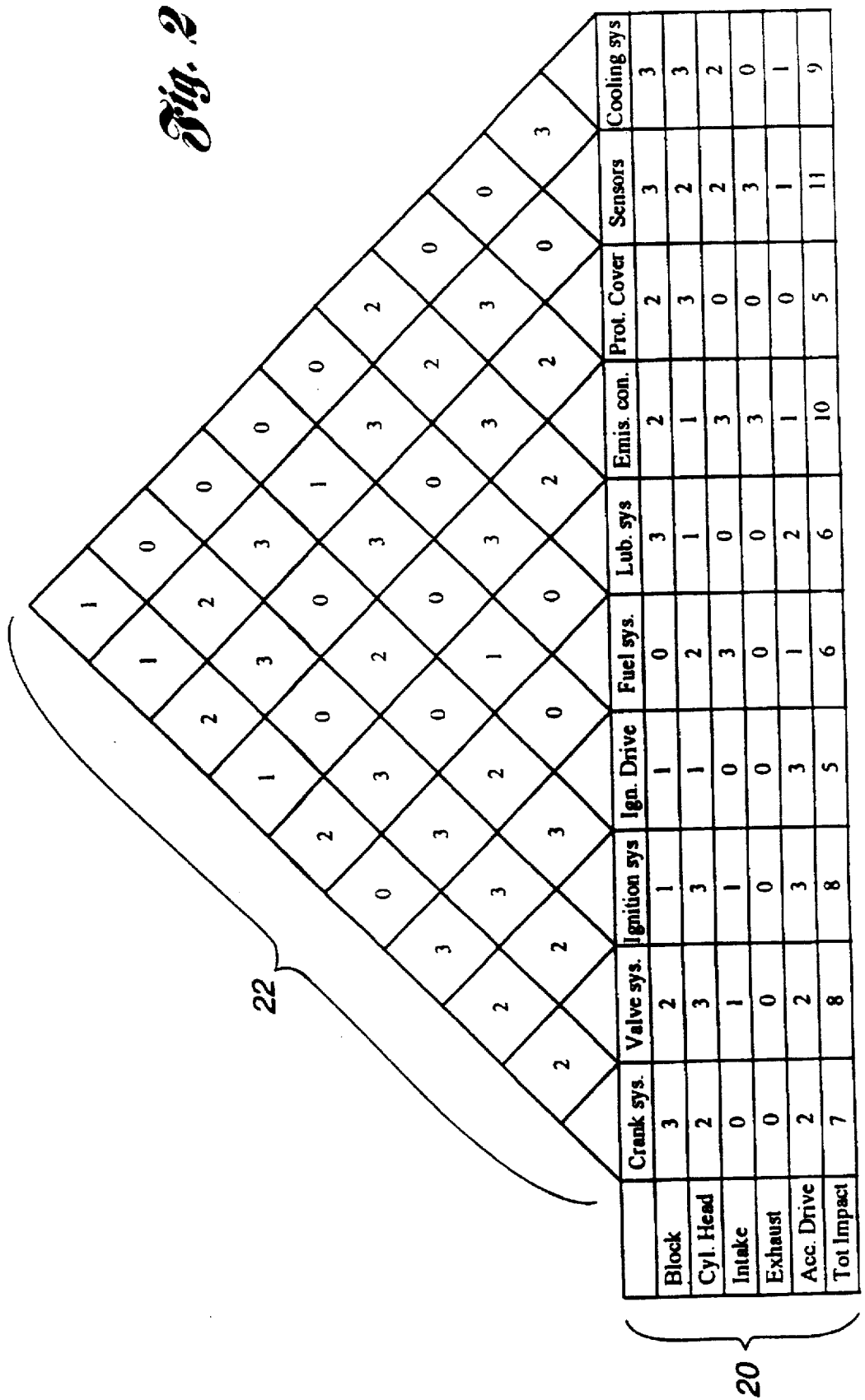
FIG. 2 is a macro view of an engine correlation matrix.

Once the scale has been determined, the interaction between major engine systems and their subsystems will be determined. The importance rankings in the present example were determined by interviewing several experts and OEM engineers in the field and by referencing various SAE test standards. The complete macro view of the major engine systems and subsystems correlation matrix is shown in FIG. 2.

The structure of each correlation matrix consists of a body 20, the lower rectangular table, and a roof 22, the triangular portion. This structure allows one to look at several interactions simultaneously. The body 20 of the matrix shows the correlation between the engine systems and the engine subsystems. The roof 22 of the matrix shows the interactions between the different subsystems. From this matrix of FIG. 2, one can select the components and subsystems that are required to test any of the major engine systems. For example, to test the cylinder-head-system, the minimum subsystems required are the ones with the highest ranking (3). These are: Valve, Ignition, Protective Covers, and Cooling systems. If a higher level of confidence is required, the second highest ranking should be added to the test, and so on.

Next in the development process, a 2nd level matrix is constructed following the same procedure as outlined above. This matrix, however is a more detailed matrix which has the subcomponents listed on the x-axis and the major engine subsystems listed in the y-axis. After the ranking process is complete, a more detailed set of tests can be composed since the amount of components involved is significantly larger. One example of a 2nd level matrix is illustrated in FIG. 3.

The following example illustrates the ranking process. The interaction between the cooling system and the crankshaft has a value of zero. This is because the cooling system is not needed in order to validate the crankshaft. Next, the interaction between sensors and the crankshaft was determined to have a value of one since there is only a weak interaction. This means that the sensors are desirable but not necessary. Third, the valve system interaction with the crankshaft is rated at a two. Therefore, it is highly desired to have the valve system present while bench testing the crankshaft, since the cyclic loading presented by the four-stroke cycle can be validated. Finally, the value associated with the ignition drive and crankshaft interaction is three. This means that the subsystem is required to validate the crank system as illustrated in Table 4.

Figure 4:
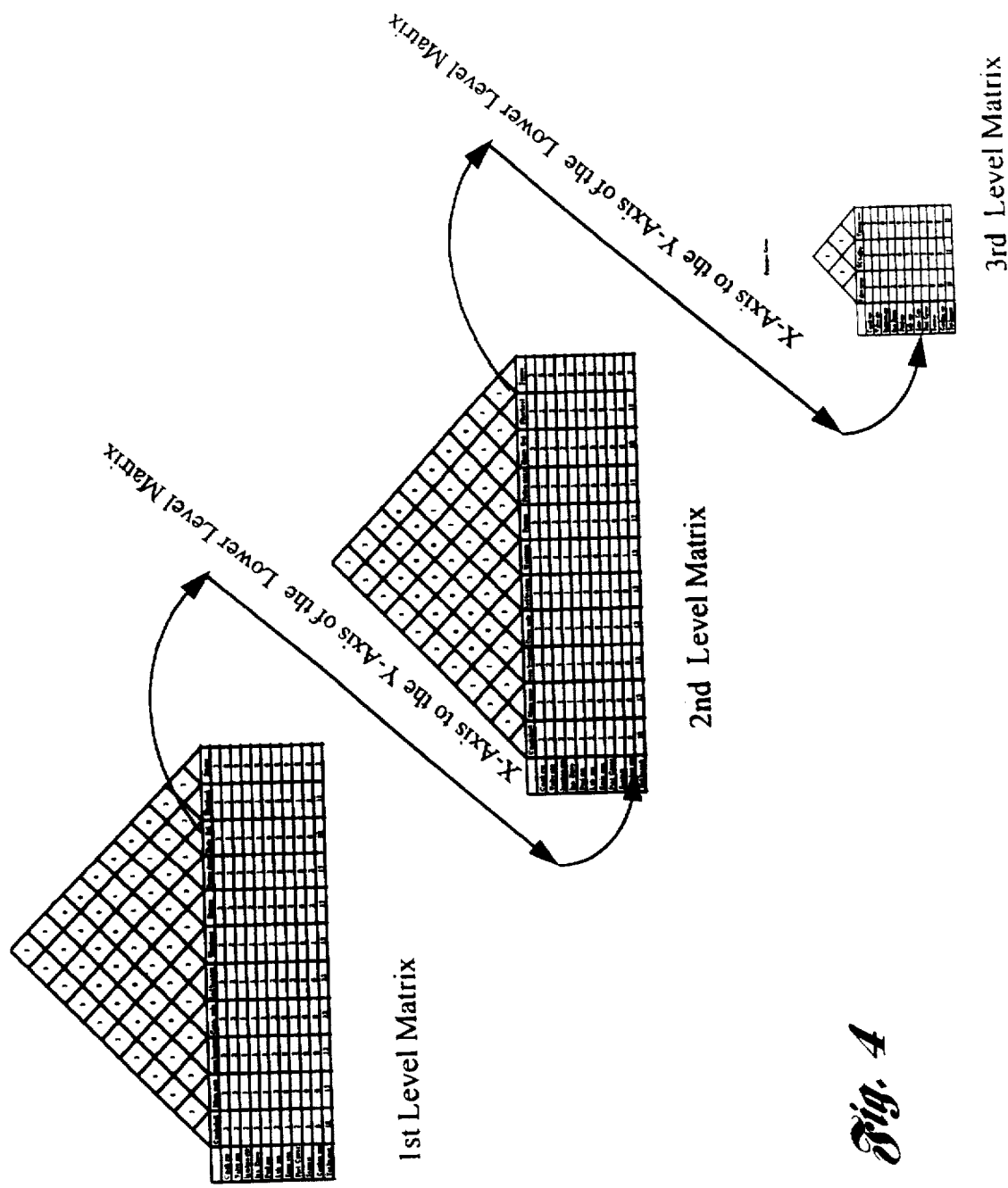
FIG. 4 is a schematic diagram illustrating breakdown of major engine systems to subsystems and components.

To construct a tertiary (3rd) level matrix, the same steps are required. The x-axis of the secondary (subsystem) matrix will become the y-axis of the tertiary matrix, and the components of the subsystem are paced at the x-axis as illustrated in FIG. 4. This process of breaking down of subsystem into its components could continue to the smallest testable component level. An example of the smallest component level is EGR valve or A.I.R. check valve.

Validation Procedure

Figure 5:
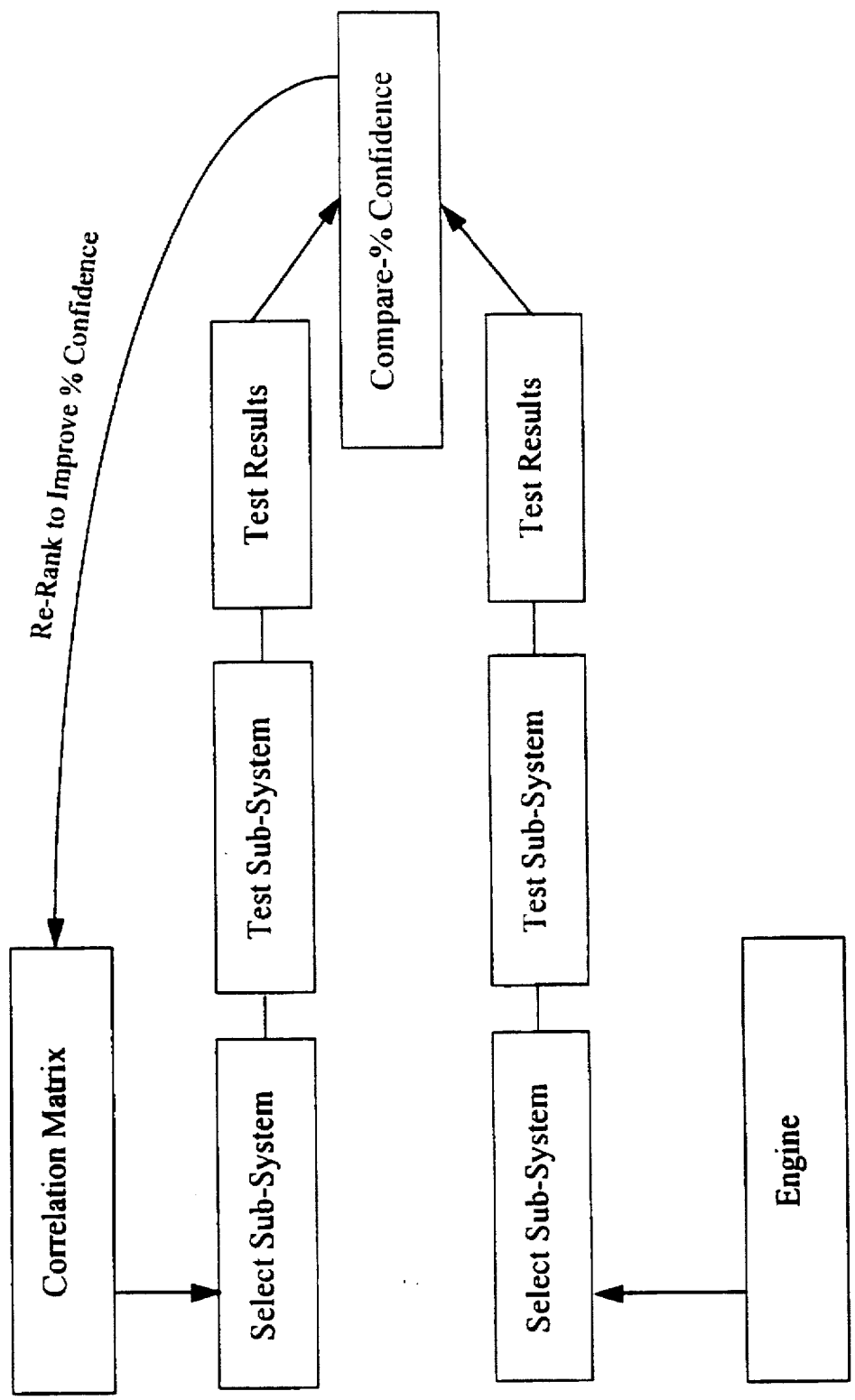
FIG. 5 is a schematic block diagram flow chart illustrating a validation procedure of the present invention.

Validation of the correlation matrix's predictability is the next natural step in applying this method. The main objective of the correlation matrices is to predict the selection of the components that would reproduce the system behavior pattern in a bench test. The strength of matrix predictability is dependent upon the matrix validation stage. Matrix validation would verify the minimum number of components required to test the subsystem. FIG. 5 shows the validation procedure.

The validation procedure is initiated by selecting a subsystem to test. The QFD subjective matrices are utilized to determine which components are required to bench test the subsystem. The QFD subjective matrices are utilized to determine which components are required to bench test the subsystem. Next, the subsystem would be tested in a bench test laboratory and predetermined engineering characteristics would be monitored.

In addition, an entire engine would be connected to a dynamometer. This enables the engineer to identify the same subsystem in its natural environment and to monitor the same predetermined engineering characteristics. The test results from the bench test can then be compared with the test results obtained on the complete engine. This comparison allows the engineer to calculate a confidence level (i.e. 50%, 7%, 99%). If the confidence level is acceptable, then this section of the matrix would be successfully validated.

Hence, the QFD matrix has successfully predicted the essential components of the subsystem needed to conduct a bench test that is representative of the natural behavior pattern of the complete engine.

If the confidence level is not acceptable, the validation procedure should be re-iterated after the subjective matrix is re-ranked. Re-ranking the subjective matrix will directly impact the confidence level. The re-ranking can be accomplished through additional interviews or via design of experiments (DOE). Table 5 summarizes the validation procedure.

TABLE 5

Validation Procedure

1. Select subsystem to test
2. Test in lab
3. Compare results with complete engine
4. Calculate confidence level
5. Validate subjective matrix or re-rank matrix and repeat procedure After the matrices are validated, they can be used as an engine development tool. The first step in applying the matrices is to select a subsystem. Next, the matrices are utilized to determine which components are required to test the subsystem. These components are selected based on their subjective rankings. The level of predictability is dependent upon which rankings are selected to qualify a component for inclusion (i.e. include all components that have a 3 ranking). Third, ASTM, SAE or internal corporate or any standard tests can be selected for the components included in the subsystem as illustrated in Table 6.

TABLE 6

SAE and ASTM Standards

| COMPONENT | STANDARD |
| --- | --- |
| Cylinder head casting-gray cast iron | SAE J431 MAR93, ASTM A 159-83 |
| Oil-tempered carbon valve springs | SAE J351 DEC88, ASTM A 23/A 231M-91 |
| Chromium-silicon alloy valve springs | ASTM A 877/AM-91 |
| Chromium-vanadium alloy steel valve springs | SAE J132 DEC88, ASTM A 232/A 232M-91 |
| Hard drawn carbon steel valve springs | SAE J172 DEC88 |
| Engine poppet valve information | SAE J775 JAN88 |
| Nonmetallic automotive gasket materials | SAE J90 JUN90 |
| Standard specifications for steel forging, carbon and alloy | ASTM A 668-90 |

Finally, the necessary tests are conducted on the subsystem. For example, Table 7 illustrates the industry common cylinder-head tests.

TABLE 7

Common Cylinder Head Tests

| | |
| --- | --- |
| 1. Durability | 13. Static stress analysis |
| 2. Powertrain engine durability test | 14. Thermocycle test |
| 3. High speed endurance test | 15. Chemistry |
| 4. Combustion analysis | 16. Hardness |
| 5. Coolant flow testing | 17. Microstructure |
| 6. Transcycle test | 18. Clamp load testing |
| 7. Trapped air analysis | 19. Flow inlet and outlet testing |
| 8. Valve scuffing tests | 20. Guide wear tests |

TABLE 7-continued

Common Cylinder Head Tests

| | |
| --- | --- |
| 9. Testing for heat rejection | 21. Valve seal flow analysis |
| 10. Spring testing | 22. Hot and cold scuffing tests |
| 11. Pin on disc tests | 23. Crossed cylinder wear tests |
| 12. Thrust washer tests | 24. Cylinder-vee block tests |

Figure 6:
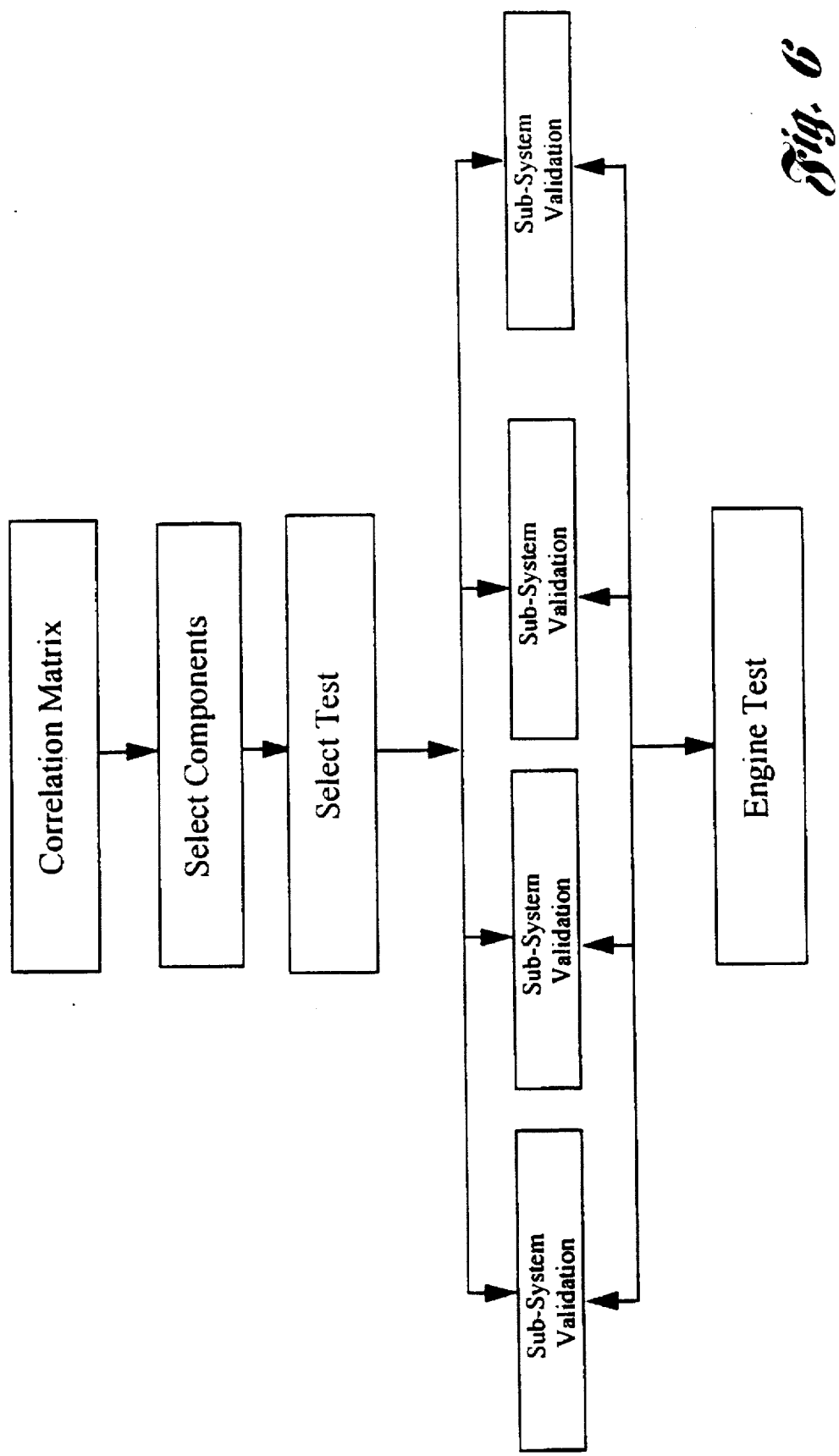
FIG. 6 is a schematic block diagram flow chart illustrating the development procedure of the method and system of the present invention.

The development procedure is shown in the FIG. 6. Table 8 summarizes the development procedure.

TABLE 8

Development Procedure

Figure 7:
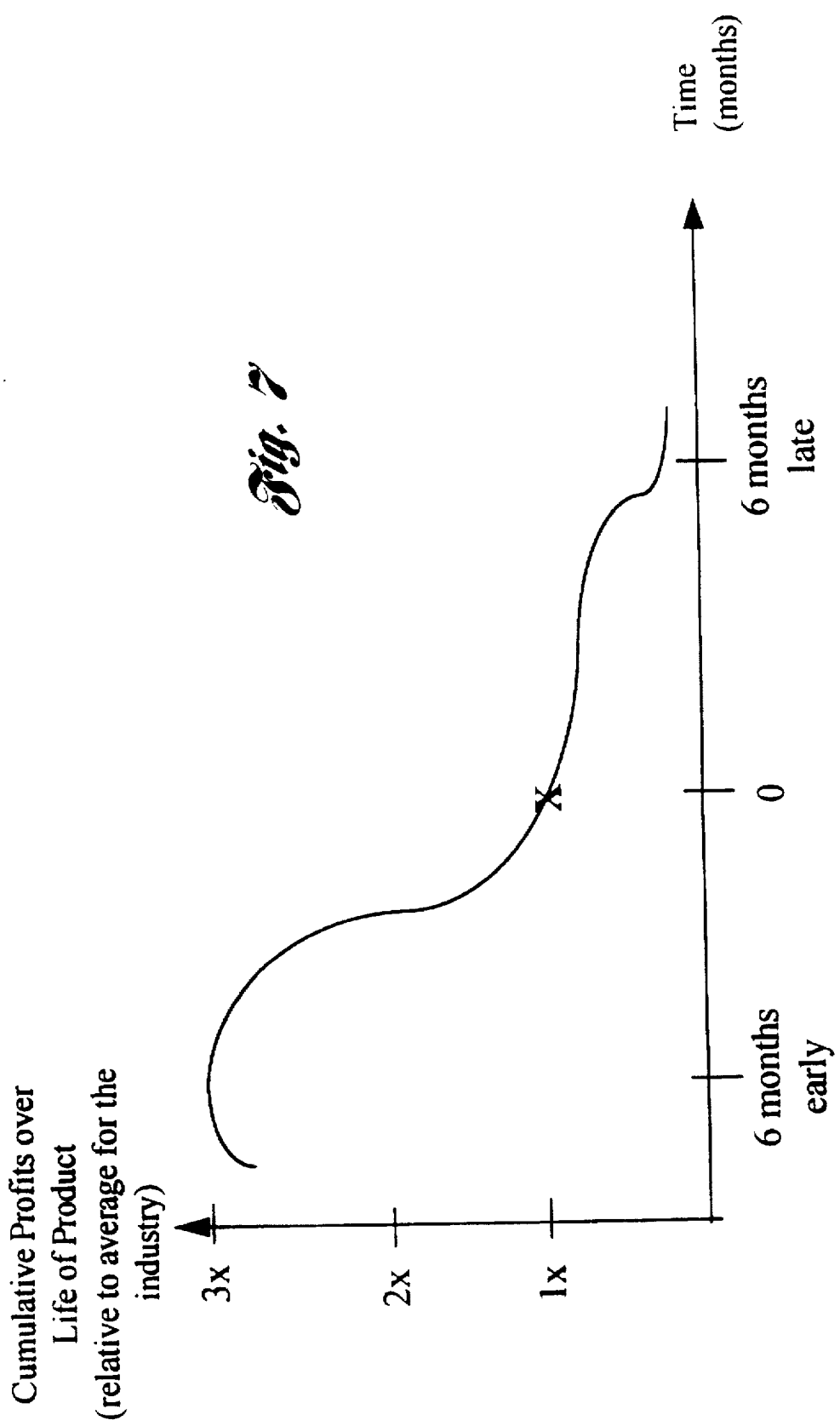
FIG. 7 is a graph illustrating the impact of market introduction timing on lifetime profits of a major new product.

1. Select subsystem
2. Determine components required for testing
3. Select test method
4. Perform test Advantages of the Method and System As previously mentioned, if a competitor can consistently introduce new features or products to the marketplace ahead of others, then it can maintain a very commanding position in that marketplace. Time-to-Market can have a big impact on company profits. As FIG. 7 indicates, introducing at the same time as competitors (0 on the horizontal axis) leads to average profits over the life of the product (1× on the vertical axis) Introducing a new product six months ahead of a competitors can triple (3×) total profits over the life of the product; introducing six months behind may mean simply breaking even." As a result, Fast-to-Market has become a top objective of all the automobile and other producers.

The correlation matrices disclosed herein seek to change the traditional sequential testing approach to parallel testing. Some of the advantages of this approach are:

1. Reduced product development time
2. Standard testing procedures
3. Minimum number of components required for testing
4. Predictable behavior of subsystems in their natural environment The correlation matrix approach disclosed herein is a tool to help engineers select the components needed to bench test a subsystem with a high level of confidence. Matrix construction, subjective ranking, validation procedure, and development procedures are defined herein. The method and system of the present invention may become a standardized development tool due to its many benefits.

A second embodiment of the present invention builds on the first embodiment of the present invention and suggests a testing sequence to reduce engine development time. Correlation matrices are utilized to identify critical engine components required to initiate parallel subsystem testing. The critical components identified permit a subsystem testing and validation stage that ensure similar subsystem performance in its natural environment with a high level of confidence. This confidence level is calculated in the matrix validation stage which allows the user to initiate only tests that will increase corporate knowledge. This will prevent premature testing of subsystems which results in increased development time and costs.

In general, the second embodiment of the invention disclosed hereinbelow includes tertiary matrix development, test identification, and validation methodologies together with the first and second level correlation matrices of the first embodiment.

The description of the second embodiment uses an overhead valve cylinder head to illustrate the development of the tertiary correlation matrices, test identification stage, and the validation process. The implementation of the correlation matrix will shift the current paradigm of the traditional sequential testing approach to parallel testing.

As previously mentioned, the parallel testing approach helps to reduce development time, minimize the number of components required for testing, and create a standardized set of testing procedures. Although engine development (cylinder head) is used as an example, the correlation matrix methodology can be developed and used for any complicated and multi-component product.

The tertiary matrix disclosed herein contains the component tests on the x-axis and the subsystem components on the y-axis. Once matrix construction is complete, it should be ranked according to the method described in the first embodiment. The ranked tertiary matrix enables the user to develop parallel testing procedures that will include only components that are essential to test subsystems. The confidence level of the test is inherent in the correlation matrix structure and is determined in the validation stage. If an acceptable confidence level is not achieved, the subsystems with a two ranking could be added to improve the confidence level. This method, however, increases the number of tests that are required. An alternative method is to re-rank the original matrix with better reference to real life data to improve matrix's predictability. The validated set of matrices defines a test procedure that increases corporate knowledge, helps reduce product development time, and permits parallel subsystem testing at the earliest stages of development.

Tertiary Matrix Construction and Ranking

To demonstrate tertiary matrix development, the cylinder head from a General Motors V6 3800 engine is used. This is selected since the first and second level matrices were developed for an overhead valve cylinder head as described with reference to the first embodiment. In addition, real life data was available from the current production engine (General Motors V6 3800) which would give a better validation to the matrix's prediction. The first step in tertiary matrix construction is to determine which matrices need to be developed. Tertiary matrices are identified by analyzing second level matrices and selecting the subcomponents with a three ranking. A three ranking is selected since this will define the lowest number of subcomponents required to test the subsystem with a high level of confidence. If a higher confidence level is desired, the users can develop matrices for subcomponents with three and two rankings which will increase the number of subcomponents required to test the subsystem.

For example, the user selects the cylinder head system. Using the main matrix (i.e. FIG. 2), four subsystems are identified with a three ranking (as illustrated in Table 9).

TABLE 9

| Required Subsystems With Three Ranking | |
|---|---|
| 1. | Valve system |
| 2. | Ignition system |
| 3. | Protective covers |
| 4. | Cooling system |

These are the four second level matrices that need to be developed an example matrix (Valve System) is shown in FIG. 8. Now that the second level matrices are identified, the required third level matrices can be determined using the same methodology as in the first embodiment of the invention.

Figure 9:
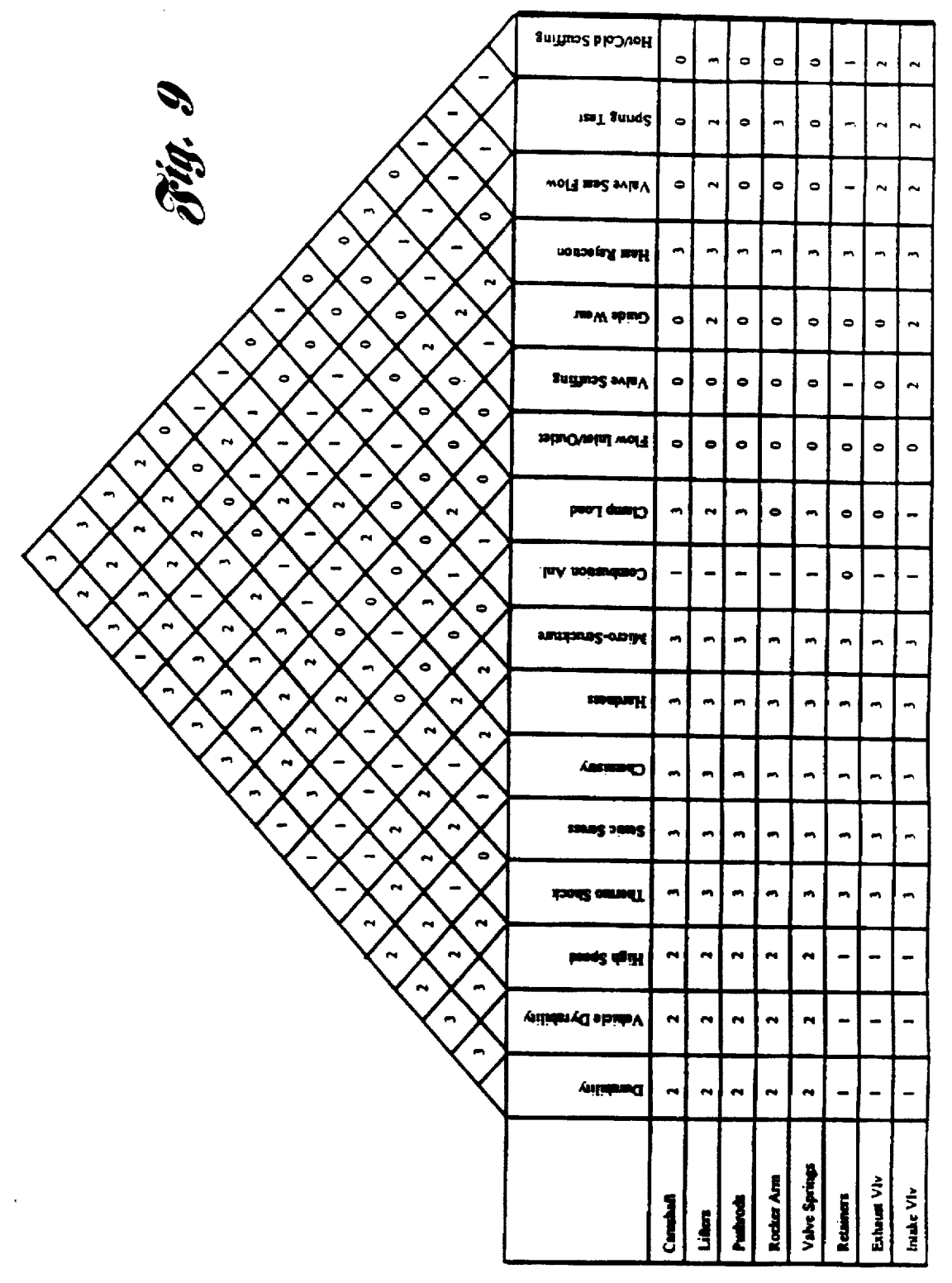

The tertiary matrix contains the subcomponent tests on the x-axis (i.e. y-axis of the second level Valve system matrix) and the subcomponents on the y-axis. The structure of the matrix is the same as those matrices introduced in the first embodiment and is illustrated in FIG. 9. The y-axis is composed of subcomponents from the second level matrix (i.e. Valve System) that were rated with a three. Subcomponent tests identified were selected to simulate entire engine behavior. The tests selected are those that have become industry, SAE, and/or ASTM standards.

Subsequent to tertiary matrix construction, it will be objectively ranked according to the procedure outlined with respect to the first embodiment. A test is given a ranking of three if it is a required test and no additional components are required to perform the test. This level matrix will also identify the possible missing tests that could be developed for future component testing. Tests such as thermal shock and static stress are given a three ranking because these tests are required to verify component functionality in extreme natural conditions exhibited by an actual engine. Tests rated with a two, such as vehicle durability, are not required for functional testing at this level but would provide valuable information. Tests ranked with a one or zero are not required at the required confidence level.

Validation

The main objective of the correlation matrix is to be able to select the minimum components and tests required to predict the behavior of a subsystem (e.g. Cylinder head) in its natural (i.e. system) environment (e.g. Engine) outside the main system. The validation process ensures that the ranked correlation matrices accurately predict the correct components required to perform a bench test. This is accomplished by assigning a confidence level to each matrix. If the confidence level is below the target value selected by the user, then the user must select components with a three or a two ranking. If the required confidence level is still not achieved, the correlation matrices must be re-ranked until the target confidence level is obtained. It is important to reach a target confidence level since the matrices will be used to develop a standardized set of testing procedures. The validation procedure flow diagram is shown in FIG. 5.

This procedure was introduced with reference to the first embodiment as illustrated herein below, utilizing correlation matrices developed for the overhead valve cylinder head.

Once the engine system to be tested is identified, the user will utilize the main matrix to identify which second level matrices (those that have a three ranking) are required. This process is repeated with the second level matrices in order to determine which third level matrices are required. After the required matrices are assembled, the confidence level can be calculated.

The first step in calculating the confidence level is to utilize the tertiary matrix to select the component tests that are required to test the subsystem (all items that have a three). These component tests are performed on the bench and compared with test results obtained while testing a complete engine. This allows the user to calculate a confidence level which is entered in its respective tertiary matrix box. This step is repeated until all component tests are completed and assigned a confidence level.

The next step is to calculate a row confidence level for the tertiary matrix. This is computed by multiplying all component confidence levels located in the column in all matrix locations that contain a three.

Next, the second level matrix row confidence level is calculated using the same method described above. Second level information is transferred to the main matrix in the same manner.

Figure 10:
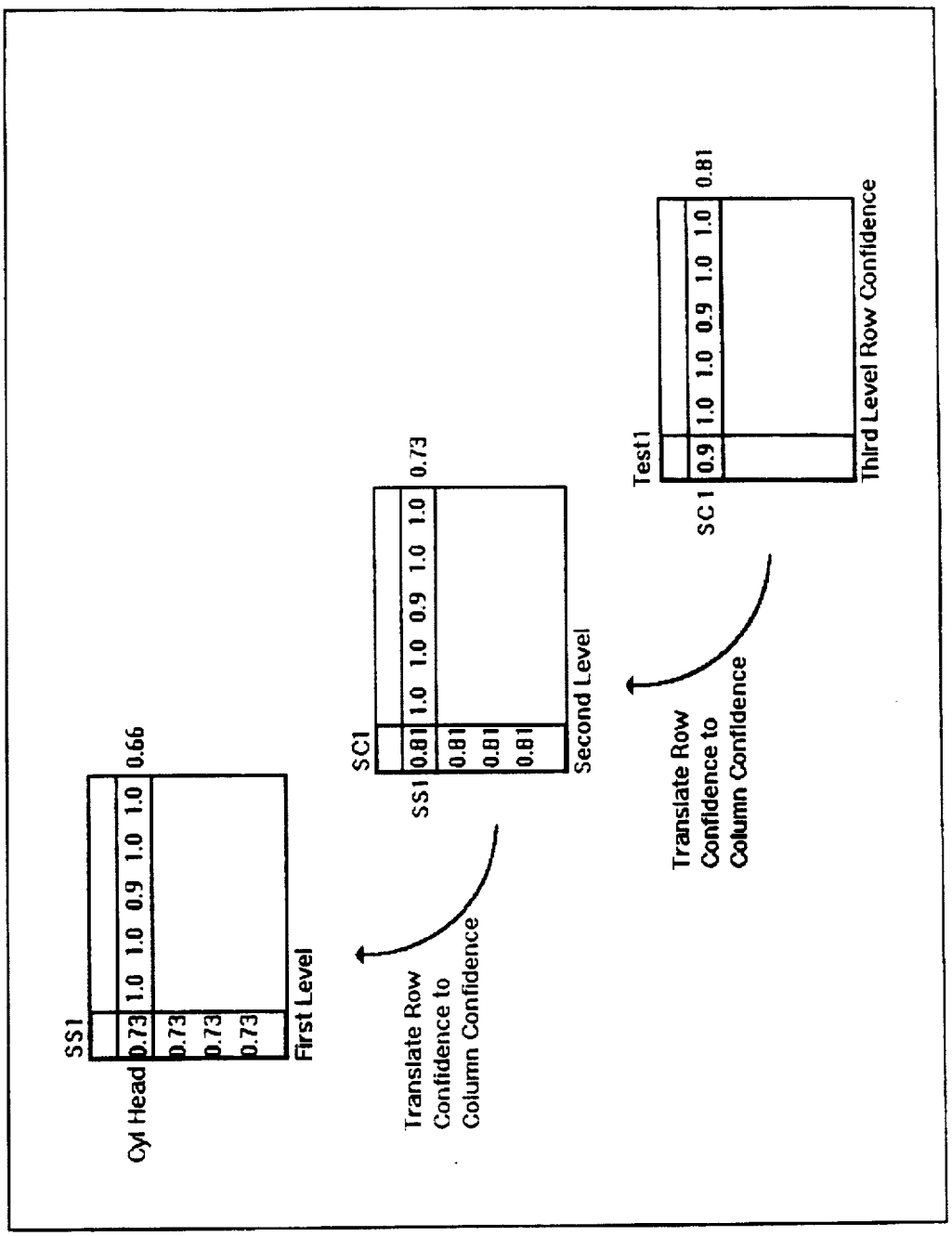
FIG. 10 is a view of three levels of correlation matrixes which illustrate a test confidence level calculation.

Finally, an overall matrix confidence level can be calculated by averaging all main matrix row confidence levels. This process is illustrated in FIG. 10.

Correlation matrix technology introduced here is a tool that allows engineers to develop standardized test procedures, identify missing tests, and help reduce development time of new products. Tertiary matrix development, test identification, and validation methodology are defined herein. A method to calculate system test confidence is also disclosed. The importance of this method of confidence identification lies in its capability to take into account the component interaction in fulfilling their functional requirements. Sole component testing is not sufficient to predict the interaction among the various functions. The methodology once established will help synthesize the component testing outcome.

While the best mode for carrying out the invention has been described in detail, those familiar with the art to which this invention relates will recognize various alternative designs and embodiments for practicing the invention as defined by the following claims.

What is claimed is:

1. A method for reducing development time of a complex system utilizing correlation matrices, the complex system having major systems, each major system having subsystems and each subsystem having components, the method comprising the steps of:

creating and storing on a computer system correlation matrices for correlating the major systems to the subsystems and the subsystems to the components;

selecting subsystems to be tested and components required for each subsystem test from the stored correlation matrices; and testing the selected subsystems in parallel separate from the complex system to obtain a first set of test results for each of the tested subsystems.

2. The method as claimed in claim 1 further comprising the step of ranking the correlation matrices to determine interactions between the subsystems and the components and between the major systems and the subsystems.

3. The method as claimed in claim 1 wherein each of the correlation matrices has a structure including a body and a roof wherein each body shows correlations and each roof shows interactions.

4. The method as claimed in claim 1 wherein each of the correlation matrices has an x-axis and a y-axis and wherein one correlation matrix has the major systems listed on its y-axis and the subsystems listed on its x-axis and wherein another correlation matrix has the subsystems listed on its y-axis and the components listed on its x-axis.

5. The method as claimed in claim 1 further comprising the step of validating predictability of each of the correlation matrices.

6. The method as claimed in claim 5 wherein the step of validating includes the step of testing the selected subsystems within the complex system to obtain a second set of test results for each of the selected subsystems and comparing the first and second sets of test results for each selected subsystem to obtain a confidence level for each of the selected subsystems.

7. The method as claimed in claim 6 further comprising the step of re-ranking the correlation matrices based on the confidence levels.

8. The method of claim 1 wherein the complex system is an automobile engine.

9. A system for reducing development time of a complex system utilizing correlation matrices, the complex system having major systems, each major system having subsystems and each subsystem having components, the system comprising:

a computer system programmed for creation and storage of correlation matrices for correlating the major systems to the subsystems and the subsystems to the components; the computer system also being programmed for selection of subsystems and components required for each subsystem test from the stored correlation matrices; and means for testing the selected subsystems in parallel separate from the complex system to obtain a first set of test results for each of the tested subsystems.

10. The system as claimed in claim 9 wherein the computer system is further programmed for ranking the correlation matrices to determine interactions between the subsystems and the components and between the major systems and the subsystems.

11. The system as claimed in claim 9 wherein each of the correlation matrices has a structure including a body and a roof wherein each body shows correlations and each roof shows interactions.

12. The system as claimed in claim 9 wherein each of the correlation matrices has an x-axis and a y-axis and wherein one correlation matrix has the major systems listed on its y-axis and the subsystems listed on its x-axis and wherein another correlation matrix has the subsystems listed on its y-axis and the components listed on its x-axis.

13. The system as claimed in claim 9 further comprising means for validating predictability of each of the correlation matrices.

14. The system as claimed in claim 13 wherein the means for validating includes means for testing the selected subsystems within the complex system to obtain a second set of test results for each of the selected subsystems and means for comparing the first and second sets of test results for each selected subsystem to obtain a confidence level for each of the selected subsystems.

15. The system as claimed in claim 14 wherein the computer system is further programmed for re-ranking the correlation matrices based on the confidence levels.

16. The system of claim 8 wherein the complex system is an automobile engine.

17. A method for reducing development time of a complex system utilizing correlation matrices, the complex system having major systems, each major system having subsystems and each subsystem having components, the method comprising the steps of:

creating and storing on a computer system correlation matrices correlating the major systems to the subsystems, the subsystems to the components and the components to component tests;

selecting subsystems to be tested, components required for each subsystem test and component tests required to test the subsystems from the stored correlation matrices; and testing the selected subsystems in parallel separate from the complex system to obtain a first set of test results for each of the tested subsystems.

18. The method as claimed in claim 17 further comprising the step of ranking the correlation matrices to determine interactions between the subsystems and the components, between the major systems and the subsystems and between the components and the component tests.

19. The method as claimed in claim 17 wherein each of the correlation matrices has a structure including a body and a roof wherein each body shows correlation and each roof shows interactions.

20. The method as claimed in claim 17 wherein each of the correlation matrices has an x-axis and a y-axis and wherein one correlation matrix has the major systems listed on its y-axis and the subsystems listed on its x-axis, and wherein another correlation matrix has the subsystems listed on its y-axis and the components listed on its x-axis and having yet another correlation matrix having the components listed on its y-axis and the component tests on its x-axis.

21. The method as claimed in claim 17 further comprising the step of validating predictability of each of the correlation matrices.

22. The method as claimed in claim 21 wherein the step of validating includes the step of testing the selected subsystems within the complex system to obtain a second set of test results for each of the selected subsystems and comparing the first and second test results for each selected subsystem to obtain a confidence level for each of the selected subsystems.

23. The method as claimed in claim 22 further comprising the step of re-ranking the correlation matrices based on the confidence levels.

24. The method of claim 17 wherein the complex system is an automobile engine.

25. A system for reducing development time of a complex system utilizing correlation matrices, the complex system having major systems, each major system having subsystems and each subsystem having components, the system comprising:

a computer system programmed for creation and storage of correlation matrices for correlating major systems to the subsystems, the subsystems to the components, and the components to component tests; and programmed for selection of subsystems to be tested, components required for each subsystem test and component tests required to test the subsystems from the stored correlation matrices; and means for testing the selected subsystems in parallel separate from the complex system to obtain a first set of test results for each of the tested subsystems.

26. The system as claimed in claim 25 wherein the computer system is further programmed for ranking the correlation matrices to determine interactions between the subsystems and the components, between the major systems and the subsystems and between the components and the component tests.

27. The system as claimed in claim 25 wherein each of the correlation matrices has a structure including a body and a roof wherein each body shows correlations and each roof shows interactions.

28. The system as claimed in claim 25 wherein each of the correlation matrices has an x-axis and a y-axis and wherein one correlation matrix has the major systems listed on its y-axis and the subsystems listed on its x-axis; wherein another correlation matrix has the subsystems listed on its y-axis and the components listed on its x-axis; and wherein yet another correlation matrix has the components listed on its y-axis and the component tests listed on its x-axis.

29. The system as claimed in claim 25 further comprising means for of validating predictability of each of the correlation matrices.

30. The system as claimed in claim 29 wherein the means for validating includes means for testing the selected subsystems within the complex system to obtain a second set of test results for each of the selected subsystems and means for comparing the first and second sets of test results for each selected subsystem to obtain a confidence level for each of the selected subsystems.

31. The system as claimed in claim 30 wherein the computer system is further programmed for re-ranking the correlation matrices based on the confidence levels.

32. The system of claim 25 wherein the complex system is an automobile engine.

* * * * *

UNITED STATES PATENT AND TRADEMARK OFFICE
CERTIFICATE OF CORRECTION

PATENT NO : 5,745,390
DATED : April 28, 1998
INVENTOR(S) : Parviz Daneshgari

It is certified that error appears in the above-identified patent and that said Letters Patent is hereby corrected as shown below:

Claim 16, Column 12, Line 49, delete "8" and insert --9--.

Claim 29, Column 14, Line 27, after "for" delete "of".

Signed and Sealed this

Third Day of November, 1998

Attest:

BRUCE LEHMAN

Attesting Officer  Commissioner of Patents and Trademarks